United States Patent [19]
Wagner et al.

[11] Patent Number: 5,544,228
[45] Date of Patent: Aug. 6, 1996

[54] METHOD AND APPARATUS FOR TRANSMISSION OF FULL FREQUENCY DIGITAL AUDIO

[75] Inventors: Byron D. Wagner, Sherman Oaks; Von W. Johnson, Burbank; Jeffrey S. Miller, Agoura; Richard T. Dempsey, Canyon Court, all of Calif.

[73] Assignee: The Walt Disney Company, Burbank, Calif.

[21] Appl. No.: 127,586

[22] Filed: Sep. 27, 1993

[51] Int. Cl.[6] ................................................. H04M 1/64
[52] U.S. Cl. ........................ 379/67; 379/102; 379/202; 395/2.44; 395/2.48; 434/308; 434/323
[58] Field of Search ........................ 379/67, 93, 101, 379/100, 202, 88, 89, 102; 370/110.1, 62, 61; 395/244, 2.45, 2.48; 324/76.15, 76.24, 76.35, 76.42; 434/156, 157, 118, 185, 307, 308, 323, 362

[56] References Cited

U.S. PATENT DOCUMENTS

| | | | |
|---|---|---|---|
| 3,896,266 | 7/1975 | Waterbury | 379/100 |
| 4,015,087 | 3/1977 | Stewart | 324/76.26 |
| 4,916,726 | 4/1990 | Morley, Jr. et al. | 379/88 |
| 4,950,999 | 4/1990 | Angello et al. | 324/76.15 |
| 5,003,577 | 3/1991 | Ertz et al. | 379/89 |
| 5,036,513 | 7/1991 | Greenblatt | 379/96 |
| 5,130,792 | 7/1992 | Tindell et al. | 348/13 |
| 5,214,650 | 5/1993 | Renner et al. | 379/93 |
| 5,381,412 | 1/1995 | Otani | 348/14 |

*Primary Examiner*—Jefferey Hofsass
*Assistant Examiner*—Fan Tsang
*Attorney, Agent, or Firm*—Hecker & Harriman

[57] ABSTRACT

The present invention is a method for transmitting full frequency digital audio signals over a network in real time and for providing access to a remote sound server. The present invention is preferably practiced using ISDN and is useful for remote casting auditions and for other communications. The present invention allows two or more sites on a network to communicate simultaneously. Live high-fidelity audio may be stored locally and/or transmitted to another site. At the other site, the audio may be stored and/or reproduced in high fidelity. Sound samples may be retrieved from a sound sample server and transmitted in high fidelity in real time over the network.

24 Claims, 3 Drawing Sheets

METHOD AND APPARATUS FOR TRANSMISSION OF FULL FREQUENCY DIGITAL AUDIO

BACKGROUND OF THE INVENTION

1. Field of the Invention

The present invention relates to the transmission of digital audio signals, particularly full frequency digital audio signals.

2. Background Art

The telephone provides convenient audio communications worldwide. However, the frequency response of a telephone line is limited. Thus, a telephone is incapable of transmitting high fidelity or full frequency sound. While the telephone provides satisfactory communications of human speech when only the content of the speech, not the characteristics of the speech, is of interest, the telephone is unsuitable for transmission of music or professional quality audio. Additionally, the telephone requires two or more parties to be connected simultaneously and in real time. If one party is unavailable at a particular time, the other party must call again at a later time to attempt to communicate with the called party. Real time refers to the actual time during which something takes place. In this context, real time refers to conditions where the amount of time required to transmit a sound is substantially equal to the duration of the original sound, such that the transmitted sound is not of a substantially longer duration than the original sound and the transmitted sound may be reproduced with substantially no delay relative to the original sound, if simultaneous reproduction is desired.

The telephone has been inadequate for certain applications within the entertainment industry, particularly in the production of international versions of domestic entertainment materials, such as movies. For international versions to be produced, the script must be translated into other languages and performers must be located to provide new soundtrack speech in the other languages. In casting these performers, it is desirable to allow domestic casting personnel to listen to auditions in foreign countries. An "audition" or "audition performance" is a trial performance by an actor to demonstrate his or her suitability or skill, and in particular his or her vocal and verbal suitability or skill. To adequately evaluate the performers, the casting personnel need to hear high-fidelity full frequency sound. At times, casting personnel may wish to listen to and direct the auditions in real time from various distant locations. At other times, however, casting personnel may wish to have the audition recorded for later listening or review. Thus, a system that allows monitoring of recorded and real time sound samples and remote casting is desirable.

Since performers are located in countries geographically remote from the casting personnel, it has been difficult for casting personnel to attend performances or participate in recording studio sessions. Listeners have had to travel to distant lands to direct and evaluate a performance, then travel back to their homeland. This involves much time and expense. To avoid such extensive travel, the mailing or transportation of audio recordings of the performances have been used as alternatives. However, the shipment of audio recordings is slow and their use often inconclusive, requiring additional recordings to be made and shipped. Thus, a system that allows listening to a performance from a remote location at a base location or some other remote location is desirable.

It is also useful for the remote auditioning locations to be able to hear stock sound samples for comparison with the auditioning performers. These sound samples may be compared with audition materials to help casting personnel make the best actor selection. Comparison may be accomplished both audibly and visually using integrated software of a type well known in the art, for example, SoundEdit Pro, manufactured by Macromedia of San Francisco, Calif., that converts audio signals into printable or displayable graphic voice patterns. Since stock sound samples may constitute large amounts of information, it may be difficult to transport them in a portable form. Thus, it is desirable to provide a method of communicating with a fixed data base of stock sound samples.

In the past, it was necessary to make tape recordings of performances and ship the tapes to the desired listener. Tapes provide high fidelity recording and do not require the listener to be present in real time, i.e., at the time the performance is given. However, tapes also do not allow the listener to listen in real time if desired. There is a substantial delay between performance and listening while the tapes are being transported. No realtime dialog between the performer and the listener is possible with tape recordings. The listener cannot make comments to the performer during the performance or between performances. Moreover, this method also results in substantial shipping costs.

Alternatively, if many performances are planned or if a lengthy performance is expected, the listener would often travel to the remote site and attend the performance in person. This approach avoids any impairment of sound quality by transmission media and allows realtime listening, but requires costly and time-consuming travel by important personnel.

Production of entertainment materials that include soundtrack materials from remote locations has also been difficult. One example of such a situation might involve the inclusion of the voice of an actor in Germany in an entertainment program or promotional message produced in France. In such a case, the actor's voice would have to be recorded on high fidelity media, such as magnetic tape, which would have to be transported from Germany to France. As in the case of casting, a substantial delay occurs and shipping costs are incurred during transportation of the media, and no realtime interaction is possible between the actor in Germany and the production personnel in France.

SUMMARY OF THE INVENTION

The present invention provides a method and apparatus for interactive transmission of full frequency broadcast quality audio signals over a network. The invention allows transmission of audio frequencies covering substantially the entire audible spectrum. The present invention also allows retrieval of sound samples from a remote location and comparison of a signal from an audio source to the sound samples. The comparison may be presented audibly or visually.

The present invention allows realtime, interactive full frequency audio communication plus data communication over the public switched telephone network (PSTN). The present invention provides portability and may be easily and quickly installed at any location with suitable access to the PSTN. The present invention avoids the need for traveling and shipping of tapes and the delays and expense associated therewith. The invention allows non-realtime and/or interactive realtime review of previous performances, allowing a listener to listen to a performance at a time convenient for the listener.

The invention is significant to the entertainment (e.g. motion picture) industry since it may be used for remote casting and production. For example, the present invention may be used to cast character voices. Production of international theatrical versions may be expedited by eliminating the need for extensive travel by creative executives and replacing the current audition process involving multiple international audio cassette shipments. Thus, revenues from international exhibition may be realized sooner while simultaneously reducing production costs.

In the present invention, microphones, recording equipment, speakers, and a computer are provided at a remote site. A medium allowing the transmission of full frequency audio plus data is provided between the remote site and a base site. A sound sample server may be located at the base site. Optionally, microphones, recording equipment and speakers may be provided at the base site. Audio at the remote site is digitally recorded and may optionally be stored in the computer at the remote site. The digital recording is compressed and transmitted to the base site. At the base site, the transmission is received and decompressed. The reconstructed full frequency audio may be reproduced for the listener and/or recorded on the sound sample server or on recording equipment (e.g. a digital audio tape (DAT) recorder) at the base site.

The present invention may also be used from the remote site to access a sound sample from a sound sample server at the local site. To access a sound sample, the computer at the remote site accesses the sound sample server at the base site, preferably through the public switched telephone network (PSTN) using an ISDN BRI connection or through a high-speed digital network. The sound sample server locates the requested sound sample stored digitally in a data file and transmits the sound sample to the remote site as a realtime digital audio signal. The computer at the remote site receives the realtime digital audio signal and reproduces the audio signal and/or stores it at the remote site for later reproduction. Software of a type well known in the art for comparing signals, such as speech signals, may be used to compare the sound sample to an audio signal, such as an actor's performance from an audition. Comparing the sound sample to the audition performance helps casting personnel select the actor best matched to the part being cast.

The preferred embodiment of the present invention uses a fully duplexed integrated services digital network (ISDN) basic rate interface (BRI) line to allow bidirectional transmission of full frequency audio and data. An ISDN BRI line comprises two 64 kbps B channels plus one 16 kbps D channel. Digitized audio and data is combined and transmitted over the two B channels of the BRI line. Optionally, data may be transmitted over the D channel. At the receiver, the digitized audio and data are received from the BRI line, separated and passed on to their respective destinations.

To practice the present invention with ISDN, analog audio signals at the remote site may be applied to a high fidelity coder/decoder (codec) at the remote site. The codec converts the analog audio signals to digital audio signals, which may be applied to a terminal adapter. A terminal adapter transmits the digital audio signals over the ISDN. At the base site, a second terminal adapter supplies the digital audio signals to a second codec. The second codec receives the signal from the terminal adapter and converts it back to a high fidelity analog audio signal. The invention may also be practiced to transmit audio signals from the base site to the remote site by applying the above procedure in the opposite direction. By using the present invention for transmission in both directions, simultaneous bidirectional communication is provided in real time. A sound server at the base site may also be accessed from the remote site over the ISDN.

As described above, the present invention allows realtime interactive full frequency audio and data communications between one or more remote sites and a base site with the option of realtime interactive listening/directing or delayed review of transmitted audio. Thus, the disadvantages of the prior art have been overcome.

DETAILED DESCRIPTION OF THE INVENTION

A method and apparatus for transmission of full frequency digital audio signals over a telecommunications network is described. In the following description, numerous specific details are set forth in order to provide a more thorough understanding of the present invention. It will be apparent, however, to one skilled in the art, that the present invention may be practiced without these specific details. In other instances, well-known features have not been described in detail in order not to unnecessarily obscure the present invention.

In the entertainment industry it is often desirable to release movies and other works in foreign countries as well as domestically. To do so, however, requires translation of the audio portion of the work into native languages of the foreign countries. It is desirable to maintain similar vocal qualities even in foreign language translations. Thus, domestic casting personnel often assist in the selection of performers in foreign countries. Casting personnel often have to travel to geographically remote locations to hear auditions by performers. To avoid having important personnel travel to remote locations, tape recordings are sometimes made of the performance and shipped to the listener. However, shipping tapes results in delays before the recordings reach the listener. Regular telephone communications are not a suitable medium because the limited range of frequencies that may be communicated does not provide broadcast quality in real time and because they do not allow review of previous performances. Thus, there is a need for a method of listening to remote performances in high fidelity audio with the capability of reviewing previous performances.

The present invention allows bidirectional, interactive, realtime high fidelity broadcast quality audio and data communications over a telecommunications network, such as the public switched telephone network (PSTN). The present invention also allows a sound sample server to be accessed from a geographically remote site and for high fidelity sound samples to be digitally retrieved in real time from the remote site. The present invention allows a listener to listen or interactively direct and record for broadcast a geographically remote performance in high fidelity and in real time and also allows review of previous performances in high fidelity. The present invention may be easily transported and installed quickly anywhere suitable communications facilities are present. The present invention may be practiced with a plurality of sites coupled together to form a network, allowing a listener to hear performances from several different sites or many listeners at different sites to hear performances at one or more sites. Thus listeners and performers are made much more accessible to one another.

Figure 1:
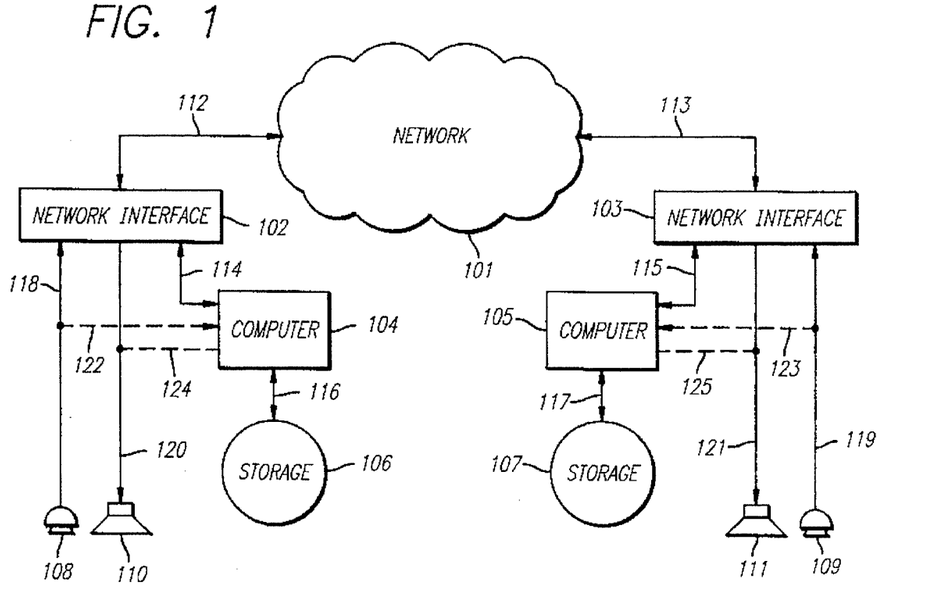
FIG. 1 is a block diagram illustrating the present invention.

A block diagram of the present invention is illustrated in FIG. 1. Microphone 108 is coupled to network interface 102 via coupling 118. Alternatively, microphone 108 is coupled to computer 104 via coupling 122. Speaker 110 is coupled to network interface 102 via coupling 120. Alternatively, speaker 110 is coupled to computer 104 via coupling 124. Computer 104 is coupled to storage device 106 via coupling 116. Computer 104 is also coupled to network interface 102 via coupling 114. Network interface 102 is coupled to network 101 via coupling 112.

Microphone 109 is coupled to network interface 103 via coupling 119. Alternatively, microphone 109 is coupled to computer 105 via coupling 123. Speaker 111 is coupled to network interface 103 via coupling 121. Alternatively, speaker 111 is coupled to computer 105 via coupling 125. Computer 105 is coupled to storage device 107 via coupling 117. Computer 105 is also coupled to network interface 103 via coupling 115. Network interface 103 is coupled to network 101 via coupling 113.

Signals picked up by microphone 108 are provided to either network interface 102 through coupling 118 or to computer 104 through coupling 122. If the microphone signals are provided directly to network interface 102, network interface 102 digitizes and compresses the signals and formats them for transmission through coupling 112 and over network 101. If the microphone signals are provided to computer 104, computer 104 digitizes the signals and provides them through coupling 114 to network interface 102. Although the signals passing through coupling 114 are preferably digital signals, they may alternatively be analog signals. Optionally, computer 104 sends digital audio signals through coupling 116 and stores them on storage device 106. Network interface 102 formats the signals for transmission through coupling 112 and over network 101.

The signals originally picked up by microphone 108 pass through network 101 and through coupling 113 to network interface 103. Network interface 103 performs digital-to-analog conversion of the signals and provides an analog output signal to speaker 111. Alternatively, network interface 103 provides signals through coupling 115 to computer 105. The signals passing through coupling 115 are preferably digital signals, but may alternatively be analog signals. If the signals are provided to computer 105, computer 105 performs digital-to-analog conversion on the signals and provides an analog output signal through coupling 125 to speaker 111. Optionally, computer 105 may send digital audio signals through coupling 117 and store them on storage device 107.

The present invention also allows for signals to pass through network 101 in the opposite direction simultaneously (fully duplexed). Signals picked up by microphone 109 are provided to either network interface 103 through coupling 119 or to computer 105 through coupling 123. If the microphone signals are provided directly to network interface 103, network interface 103 digitizes and compresses the signals and formats them for transmission through coupling 113 and over network 101. If the microphone signals are provided to computer 105, computer 105 digitizes the signals and provides them through coupling 115 to network interface 103. Although the signals passing through coupling 115 are preferably digital, they may alternatively be of an analog nature. Optionally, computer 105 sends digital audio signals through coupling 117 and stores them on storage device 107. Network interface 103 formats the signals for transmission through coupling 113 and over network 101.

The signals originally picked up by microphone 109 pass through network 101 and through coupling 112 to network interface 102. Network interface 102 performs digital-to-analog conversion of the signals and provides an analog output signal to speaker 110. Alternatively, network interface 102 provides signals through coupling 114 to computer 104. The signals passing through coupling 114 are preferably digital signals, but may alternatively be analog signals. If the signals are provided to computer 104, computer 104 performs digital-to-analog conversion on the signals and provides an analog output signal through coupling 124 to speaker 110. Optionally, computer 104 sends digital audio signals through coupling 116 and stores them on storage device 106.

Figure 2:
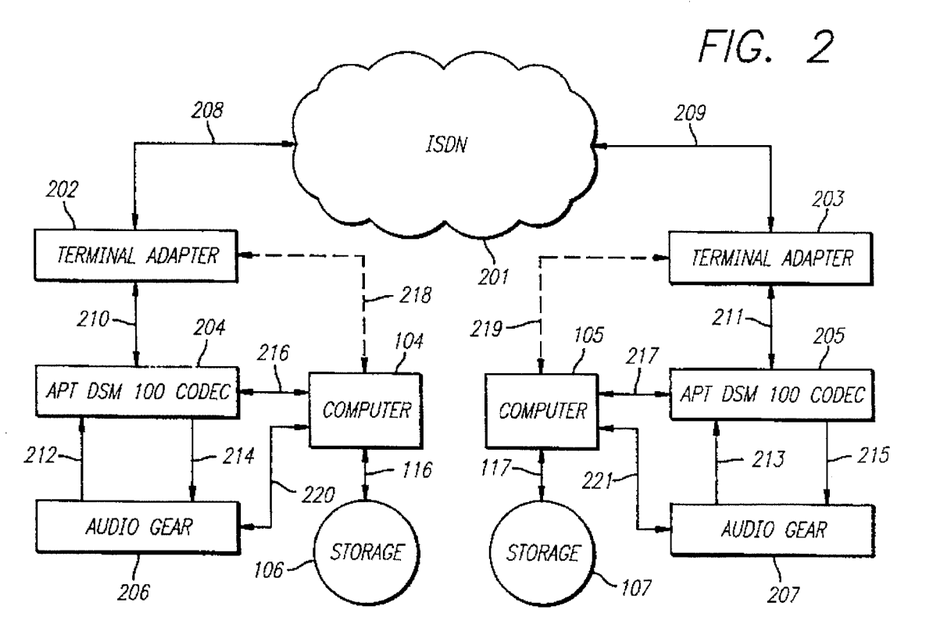
FIG. 2 is a block diagram illustrating the preferred embodiment of the present invention.

A block diagram of the preferred embodiment of the present invention is illustrated in FIG. 2. Audio gear 206 is coupled through couplings 212 and 214 to APT DSM100 codec 204. Coupling 212 couples signals from audio gear 206 to codec 204. Coupling 214 couples signal from codec 204 to audio gear 206. Audio gear 206 is coupled through coupling 220 to computer 104. Codec 204 is coupled to computer 104 through coupling 216. Computer 104 is coupled to storage device 106 through coupling 116. Codec 204 may be coupled to terminal adapter 202 through coupling 210. Alternatively or supplementally, computer 104 may be coupled to terminal adapter 202 through coupling 218. Terminal adapter 202 is coupled to ISDN 201 through coupling 208.

Audio gear 207 is coupled through couplings 213 and 215 to APT DSM100 codec 205. Coupling 213 couples signals from audio gear 207 to codec 205. Coupling 215 couples signal from codec 205 to audio gear 207. Audio gear 207 is coupled through coupling 221 to computer 105. Codec 205 is coupled to computer 105 through coupling 217. Computer 105 is coupled to storage device 107 through coupling 117. Codec 205 is coupled to terminal adapter 203 through coupling 211. Alternatively or supplementally, computer 105 is coupled to terminal adapter 203 through coupling 219. Terminal adapter 203 is coupled to ISDN 201 through coupling 209.

An analog-to-digital (A/D) and digital-to-analog (D/A) conversion device, or coder/decoder (codec), preferably the DSM100 made by Audio Processing Technology, that uses a data compression algorithm to allow bidirectional full frequency audio to be transmitted over digital channels, may be employed. The DSM100 is coupled to the ISDN BRI line through an ISDN BRI terminal adapter (TA). One DSM100 is used at each site connected to the ISDN.

The APT DSM100 digital audio transceiver is produced by Audio Processing Technology Limited (HQ), 21 Stranmillis Road, Northern Ireland, BT9 5AF. The DSM100 uses an apt-X100 digital audio data compression system to provide a 4:1 compression ratio. The DSM100 may be configured to transmit one audio signal (mono mode) or two simultaneous audio signals (stereo mode) with selectable bandwidths between 6.2 kHz and 22.5 kHz. The DSM100 provides balanced XLR analog audio inputs and outputs for coupling the DSM100 to analog audio apparatus. Alternatively, Sony®/Philips® Digital Interface Format (SPDIF) and Audio Engineering Sociaty/European Broadcasting Union (AES/EBU) digital audio inputs and outputs are provided for coupling to digital audio apparatus. The DSM100 also provides an RS449/RS422/X.21 compatible interface that allows connection to an ISDN BRI TA.

Full frequency audio from audio gear 206 is provided to an audio input of DSM100 codec 204 through coupling 212. DSM100 codec 204 digitizes (if the audio input is analog) and compresses the audio signal and provides a digital output through coupling 210 to TA 202. TA 202 transmits the digital signal through coupling 208 and ISDN 201. The signal remains in digital form while transmitted via ISDN 201. At the opposite end of ISDN 201, a second TA 203 receives the signal through coupling 209 and provides it through coupling 211 to a second DSM100 codec 205. DSM100 codec 205 decompresses the signal, converts it to analog form and provides a full frequency analog output signal through coupling 215 that may be monitored, amplified or otherwise processed by audio gear 207. Alternatively, the signal may be left in digital form and provided as an uncompressed digital audio output signal through coupling 215. DSM100 codec 205 can also transmit full frequency audio in the opposite direction through ISDN 201 for reception by DSM100 codec 204. Couplings 213 and 214 are used to couple signals during transmission in the opposite direction. Depending on the situation, bidirectional or unidirectional communication may be occur in either a full or half duplex mode. Full duplex communication allows signals to be sent in both directions simultaneously, while half duplex communication allows signals to be sent in only one direction at a time. Although a half duplex mode may be used for unidirectional or alternating bidirectional communication, it is preferable to use a full duplex mode for both unidirectional and bidirectional communication. Thus, bidirectional full frequency audio transmission is provided.

Digital data may also be transmitted along with full frequency audio. Digital data from one end of the ISDN line may be provided from a computer 104 to DSM100 codec 204 through coupling 216, which combines the data with the digital audio signal and compresses it. The combined audio and data signal in compressed form is provided through coupling 210 to TA 202, which transmits it over ISDN 201. A second TA 203 at the opposite end of ISDN 201 receives the combined signal and provides it to a second DSM100 codec 205. DSM100 codec 205 decompresses the signal and separates the data from the audio signal. The data is provided to a second computer 105 through coupling 217. Likewise, the second computer may transmit data in the opposite direction over ISDN 201 to first computer 104. This data communication may occur simultaneously with the transmission of full frequency audio. Alternatively, data may pass from the first computer 104 through coupling 218 to the first TA 202, which transmits the data over ISDN 201, preferably over an ISDN BRI D channel. The second TA 203 may receive the data from ISDN 201 and send it to the second computer 105 through coupling 219. Computer 104 may communicate with storage device 106 through coupling 116 to allow storage of data and audio signals. Likewise, computer 105 may communicate with storage device 107 through coupling 117 to allow storage of data and audio signals. The digital data stream may contain control commands for remotely operating audio or data storage devices.

Audio gear 206 may include an audio source for producing a signal and other equipment for receiving a signal. For example, the audio source might include a microphone and/or recording equipment, and the equipment for receiving the signal might include a loudspeaker and/or recording equipment. Audio input signals from the audio source may be provided to computer 104 via coupling 220. Audio output signals from the computer 104 may be provided to the equipment for receiving the signal via coupling 220.

Audio gear 207 may include an audio source for producing a signal and other equipment for receiving a signal. Audio input signals from the audio source may be provided to computer 105 via coupling 221. Audio output signals from the computer 105 may be provided to the equipment for receiving the signal via coupling 221.

REMOTE SOUND SERVER

The present invention may be practiced as a remote sound server to provide a method for reviewing remotely conducted auditions, either in real time or delayed time, and to provide a remotely accessible data base of stock sound samples. A base site may be equipped with storage means and audio reproducing means to record and reproduce audio signals transmitted over the network connection. In the preferred embodiment of the present invention, storage device 106 may be used to store audio signals and computer 104, codec 204 and audio gear 206 may be used to reproduce the audio signals. A remote site at the opposite end of the network connection may be equipped with microphones and sound reproducing means. In the preferred embodiment of the present invention, audio gear 207 includes microphones and TA 203, codec 205 and audio gear 207 may be used to reproduce sounds. As an audition is being conducted, microphones included in audio gear 207 may be used to convert the sound to a signal to be transmitted over the network. The signal is received at the base site and reproduced immediately or recorded for later reproduction on a sound server at the base site. The sound server may include computer 104 and storage device 106. Control of the recording and reproduction may be provided locally at the base site or may be performed by the remote site over the data communications connection between the sites. The data communications connection may be provided through ISDN 201 or another data communications medium (i.e., T-1 or megastream data network).

If the remote site wishes to access stock sound samples stored in a data base at the base site, the remote site may request the sample from the base site via the data communications channel of the communications line between the sites or through other high-speed digital lines. The base site then transmits the desired sound sample in the form of a digital signal to the remote site, where it is reproduced in real time as full frequency sound. The signal may also be stored at the remote site for later reproduction. Thus, the remote site may access a vast library of stock sound samples, including recognizable character voices, in real time using portable equipment.

Figure 3:
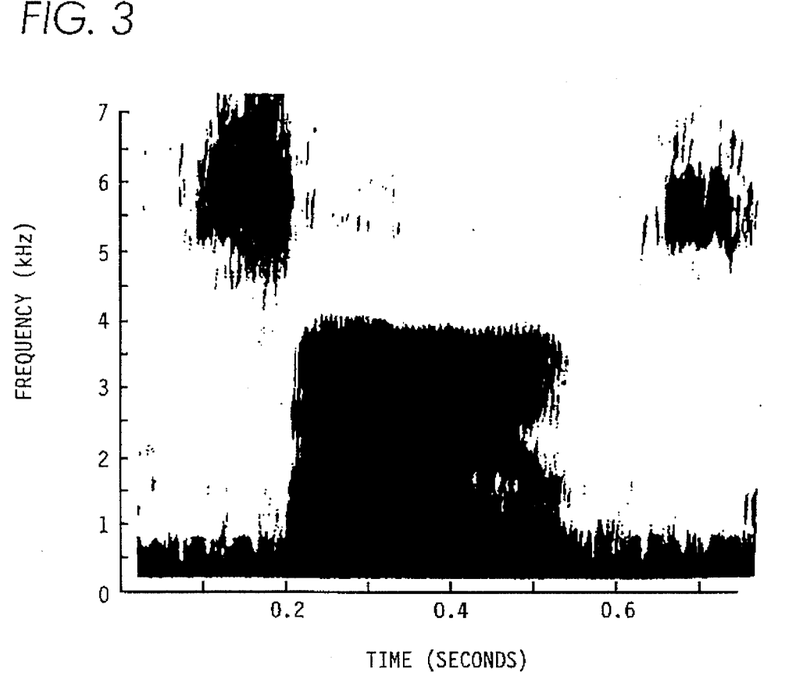
FIG. 3 is a sound spectrogram of the audition performance of a first actor.
Figure 4:
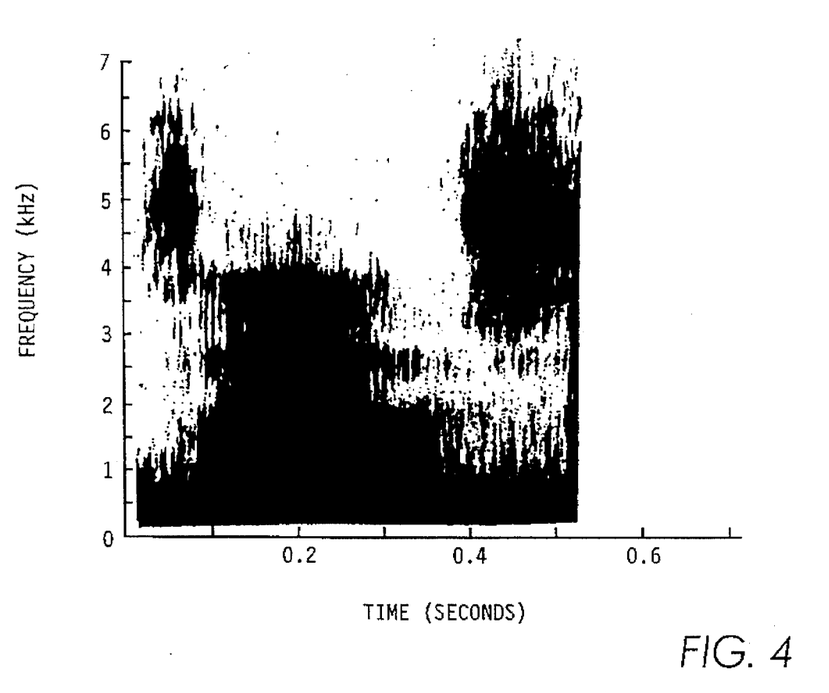
FIG. 4 is a sound spectrogram of the audition performance of a second actor.
Figure 5:
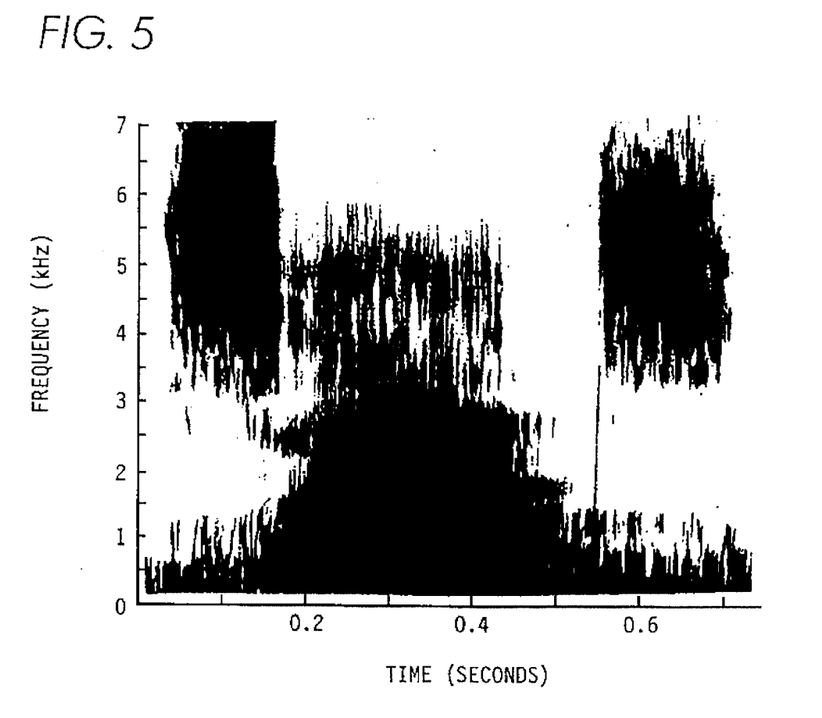
FIG. 5 is a sound spectrogram of the audition performance of a third actor.
Figure 6:
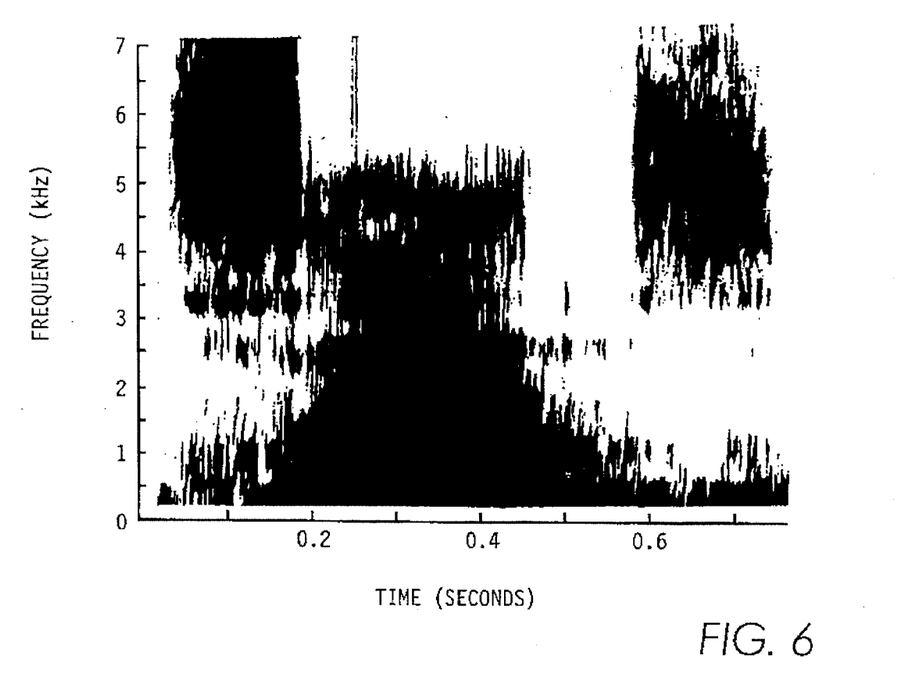
FIG. 6 is a sound spectrogram of a sound sample.

The stock sound samples may be used to prepare an actor for an audition by allowing the actor to hear the desired sound prior to his performance. The stock sound samples may also be used to provide a basis for comparison of the audition performance. Commercially available signal analysis software may be used to compare the signals. The comparison may involve the production and display of sound spectrograms. Sound spectrograms are typically two-dimensional images of sound over time. For example, the horizontal axis of a sound spectrogram may represent time, the vertical axis may represent frequency, and the darkness, intensity, shade or color of the image represents sound level. FIGS. 3, 4, 5 and 6 are examples of sound spectrograms. Assuming the sound spectrogram of FIG. 6 represents the sound sample of the desired sound and the sound spectrograms of FIGS. 3, 4 and 5 represent three audition performances by three actors, the sound spectrograms of FIGS. 3, 4 and 5 can be compared against the sound spectrogram of FIG. 6 to determine the closest match. Among FIGS. 3, 4 and 5, FIG. 5 is the closest match to the sound spectrogram of FIG. 6, so the actor represented by the sound spectrogram of FIG. 5 should be cast for the role represented by the sound spectrogram of FIG. 6.

Other types of comparisons are also possible. For example, spectrum analysis software or hardware may be used to display images representative of the Fourier transforms of the sound sample and the audition performances. Fourier transform images are typically two-dimensional images for an instant in time with frequency represented along the horizontal axis and amplitude represented along the vertical axis. However, three-dimensional images or sequences in time of the two-dimensional images are also possible. It is also possible to use differential or digital subtraction images, which subtract the image of the sound sample from the image of the audition performance, to illustrate the differences between the sound sample and the audition performance. Other types of signal analysis and comparison as are well known in the art may be used with the present invention.

DATA COMMUNICATIONS

The present invention may also be used to transmit textual or graphic materials (such as scripts, character guides, memoranda, etc.) between the sites. Such materials are preferably transmitted over a high-speed digital network or over the PSTN, but may be transmitted over the data communications channel (such as the ISDN D channel or the data port of the DSM100 codec) of the communications line. Optionally, the PSTN, the digital network or ISDN can be used to send documents from one computer to another. The "digital network" may be a full T-1 or Megastream data network operating at 1.2–1.7 mbps. In the case of PSTN, access and transfer is accomplished through a standard asynchronous modem at 9600 or 14.4 Kbps. Faster data transmission is possible by using compression protocols (i.e., V.42bis).

For example, from a laptop or desktop computer, a user accesses a file server that recognizes the user's name and password. The server contains:

Continuity/dialogue and line scripts of a current release;

Creative notes from a designated creative director.

Technical notes from a designated technical manager.

The user browses the items which are organized in a manner that is both logical and user friendly. The user "downloads" selected documents into their local laptop or desktop computer and disconnects. The user now has a virtual duplicate of the original, fully-formatted document. In the case of a script where the typical page count is over 200, this method of transfer is both time and cost effective.

Accessing the server through the T-1 is the same as above except for the asynchronous connection via the modem.

MULTIPLE REMOTE SITES

The present invention may be practiced with multiple remote sites. The remote sites may communicate audio signals or data in real time with the base site and/or with other remote sites. The remote sites may transmit full frequency audio signals to the base site for monitoring or storage. The base site may select a remote site to be monitored. If the audio signals from one remote site are stored at the base site, the base site, the remote site that provided the signals and all or a combination of the other remote sites may be allowed to access and retrieve the stored audio signals at the base site. The remote sites may also access stock sound samples stored at the base site or audio signals provided by the base site.

We claim:

1. A system comprising:

a network for transmitting digital information;

a plurality of sites coupled to said network, said plurality of sites comprising:

an audio source for providing an analog audio input signal;

a speaker for reproducing an analog audio output signal;

analog-to-digital conversion means coupled to said audio source for converting said analog audio input signal to a digital audio input signal;

a data compression means coupled to said analog-to-digital conversion means to convert said digital audio input signal to a compressed digital audio input signal;

digital-to-analog conversion means coupled to said speaker for providing said analog audio output signal to said speaker;

a first network interface means coupled to said data compression means, said first network interface means for transmitting said compressed digital audio input signal to said network;

a second network interface means coupled to said network for receiving said compressed digital audio input signal from said network:

digital audio storage means coupled to said second network interface means;

wherein said analog audio input signal is converted by said analog-to-digital conversion means to said digital audio input signal, and wherein said digital audio input signal is converted to said compressed digital audio input signal and transmitted by said network to said digital audio storage means for storage therein, and wherein said digital audio storage means retrieves said compressed digital audio input signal, wherein said compressed digital audio input signal is converted to said analog audio output signal by said digital-to-analog conversion means, and wherein said speaker reproduces said analog audio output signal.

2. The system of claim 1 wherein said audio source comprises a microphone.

3. The system of claim 2 wherein said audio source further comprises recording equipment.

4. The system of claim 1 wherein said network is an ISDN.

5. The system of claim 1 wherein a codec with data compression capability comprises said analog-to-digital conversion means and said digital-to-analog conversion means.

6. The system of claim 4 wherein said network interface is an ISDN basic rate interface (BRI) terminal adapter (TA).

7. A system comprising:

an audio source for providing a first analog audio signal;

a computer for providing a first digital data signal;

a first analog-to-digital conversion means for converting said first analog audio signal to a first digital audio signal;

a first data compression means coupled to said first analog-to-digital conversion means to convert said first digital audio signal to a first compressed digital audio signal;

a first end of a telecommunication line coupled to said first data compression means for transmitting said first compressed digital audio signal and said first digital data signal;

a first digital-to-analog conversion means coupled to a second end of said telecommunication line for separating said first compressed digital audio signal and said first digital data signal and for converting said first compressed digital audio signal to a second analog audio signal, said second analog audio signal substantially identical to said first analog audio signal and having a frequency range substantially equal to a range of audible frequencies;

a sound server comprising a library of sound samples coupled to said first digital-to-analog conversion means for receiving said first digital data signal and for producing a third analog audio signal from said library of sound samples;

a second analog-to-digital conversion means coupled to said sound server for converting said third analog audio signal to a second digital audio signal;

a second data compression means coupled to said second analog-to-digital conversion means to convert said second digital audio signal to a second compressed digital audio signal, said second data compression means transmitting said second compressed digital audio signal over a transmission line;

a second digital-to-analog conversion means coupled to said first end of said telecommunications line for converting said second compressed digital audio signal to a fourth analog audio signal substantially identical to said third analog audio signal and having a frequency range substantially equal to a range of audible frequencies.

8. The system of claim 7 wherein said library of said sound samples comprises a library of character voice samples.

9. The system of claim 7 wherein said telecommunication line is an ISDN basic rate interface (BRI) line.

10. The system of claim 7 wherein a first codec comprises said first data compression means, said first analog-to-digital conversion means and said second digital-to-analog conversion means, and wherein a second codec comprises said second data compression means, said second analog-to-digital conversion means and said first digital-to-analog conversion means.

11. A method for using a telecommunication network for communicating audio signals comprising the steps of:

digitizing an analog audio input signal at a first site to provide a digital audio signal;

performing a data compression operation on said digital audio signal to provide a compressed digital audio signal;

communicating said compressed digital audio signal from said first site to a second site;

performing a data decompression operation on said compressed digital audio signal to provide a decompressed digital audio signal;

performing a digital-to-analog conversion operation on said decompressed digital audio signal to provide an analog audio output signal, said analog audio output signal being substantially identical to said analog audio input signal over a frequency range substantially equal to a range of audible frequencies;

communicating a digital data signal from said first site to said second site;

retrieving a stored sound sample from a computer at said second site;

communicating said stored sound sample digitally in real time from said second site to said first site.

12. The method of claim 11 wherein said step of communicating said compressed digital audio signal comprises transmitting said compressed digital audio signal over an ISDN basic rate interface (BRI) line.

13. The method of claim 12 wherein said step of communicating said digital data signal comprises transmitting said digital data signal over an ISDN basic rate interface (BRI) line.

14. The method of claim 11 wherein said step of performing said data compression operation has a compression ratio of 4:1.

15. The method of claim 11 further comprising the steps of:

using a microphone for obtaining in audition performance containing a range of audible frequencies, said microphone outputting said analog audio input signal;

using said computer for producing a comparison image comparing said stored sound sample to said audition performance.

16. The method of claim 15 wherein said step of producing said comparison image further comprises the step of producing a sound spectrogram by said computer.

17. A method for electronically comparing an audition performance to a sound sample comprising the steps of:

accessing a database coupled to a local end of a communication network containing said sound sample;

electronically retrieving said sound sample from said database in real time;

obtaining said audition performance;

performing a data compression operation on said audition performance to obtain a compressed audition performance;

transmitting said compressed audition performance over said communication network to said local end of said communication network;

performing a data decompression operation on said compressed audition performance to obtain said audition performance;

producing a comparison image comparing said sound sample to said audition performance.

18. The method of claim 17 wherein said step of producing said comparison image comprises the steps of:

producing a first image representative of said sound sample; and producing a second image representative of said audition performance.

19. The method of claim 18 wherein said step of producing said first image comprises a step of producing a first sound spectrogram and said step of producing said second image comprises a step of producing a second sound spectrogram.

20. The method of claim 18 wherein said step of producing said first image comprises a step of producing a first Fourier transform image and said step of producing said second image comprises a step of producing a second Fourier transform image.

21. The method of claim 17 wherein said step of producing said comparison image comprises a step of producing a differential or digital subtraction image derived from said sound sample and from said audition performance.

22. The method of claim 21 wherein said step of producing said comparison image comprises a step of producing a sound spectrogram.

23. The method of claim 21 wherein said step of producing said comparison image comprises a step of producing a Fourier transform image.

24. A system comprising:

an audio source for providing a first analog audio signal;

a computer for providing a first digital data signal;

a first analog-to-digital conversion means for converting said first analog audio signal to a first digital audio signal;

a first data compression means coupled to said first analog-to-digital conversion means to convert said first digital audio signal to a first compressed digital audio signal;

a first end of a telecommunication line coupled to said first data compression means for transmitting said first compressed digital audio signal and said first digital data signal;

a first digital-to-analog conversion means coupled to a second end of a telecommunication line for separating said first compressed digital audio signal and said first digital data signal and for converting said first compressed digital audio signal to a second analog audio signal, said second analog audio signal substantially identical to said first analog audio signal and having a frequency range substantially equal to a range of audible frequencies;

a sound server comprising a library of sound samples coupled to said first digital-to-analog conversion means for receiving said first digital data signal and for producing a third analog audio signal from said library of sound samples;

a second analog-to-digital conversion means coupled to said sound server for converting said third analog audio signal to a second digital audio signal;

a second data compression means coupled to said second analog-to-digital conversion means to convert said second digital audio signal to a second compressed digital audio signal, said second data compression means transmitting said second compressed digital audio signal over a transmission line;

a portable computer having a second digital-to-analog conversion means coupled to said first end of said telecommunications line for converting said second compressed digital audio signal to a fourth analog audio signal substantially identical to said third analog audio signal and having a frequency range substantially equal to a range of audible frequencies.

* * * * *